United States Patent [19]

Larson

[11] 3,787,732

[45] Jan. 22, 1974

[54] ELECTRONIC SWITCH APPARATUS SENSITIVE TO AND ACTUATED BY TOUCH

[75] Inventor: Willis A. Larson, Wayzata, Minn.

[73] Assignee: Magic Dot, Inc., Minneapolis, Minn.

[22] Filed: Dec. 18, 1972

[21] Appl. No.: 316,356

[52] U.S. Cl. ......... 307/116, 317/DIG. 2, 340/365 R

[51] Int. Cl. ........................................... H01h 35/00

[58] Field of Search .. 200/DIG. 1, DIG. 2; 307/116, 307/118; 317/DIG. 2; 340/365 R, 365 C

[56] References Cited

UNITED STATES PATENTS

| | | | |
|---|---|---|---|
| 3,728,501 | 4/1973 | Larson et al. | 200/DIG. 2 X |
| 3,144,592 | 8/1964 | Leeds | 317/148.5 |

*Primary Examiner*—Robert K. Schaefer
*Assistant Examiner*—William J. Smith
*Attorney, Agent, or Firm*—Wicks & Nemer

[57] ABSTRACT

An electronic switch which has no moving parts and is actuated by the capacitance of an operator providing a connection between earth ground and an input to the electronics associated with the switch or is actuated by the skin resistance of an operator causing a lowering of D.C. resistance across the face of the switch, or both, is disclosed. The electronic switch, in the preferred embodiment shown, includes three electrodes arranged with respect to each other upon the top surface of an insulator in a laterally spaced, electrically insulated relation with the third electrode performing as a conductive electrical shielding electrode between the first and second electrodes. The first and second electrodes are exposed to the finger of an operator upon the top surface of the insulator in a manner to allow the bridging of the first and second electrodes to thus provide a direct current path to be set up laterally between the first electrode and the second electrode to thereby provide an activation of the switch through the lowering of the D.C. resistance across the face of the switch. When the operator's finger is removed, the shielding effect of the third electrode prevents any leakage currents from flowing between the first electrode and the second electrode from causing a switch activation. Further, the first and second electrodes are accessible to touch by the operator to thereby allow the operator's touch to provide an alternating voltage signal to provide an activation of the switch. Electronics which allows activation of the switch is shown in the form of a first amplifier accepting the electronic signal input provided by the operator's finger and providing a related signal to an integrator, shown in the preferred embodiment as a capacitor. A second amplifier is connected to the integrator to provide a switched output, with the switched output providing a first state for approximating an electrical short circuit and a second state for approximating an electrical open circuit.

6 Claims, 3 Drawing Figures

ELECTRONIC SWITCH APPARATUS SENSITIVE TO AND ACTUATED BY TOUCH

BACKGROUND

This invention relates generally to electronic switching and more specifically to an electronic switch which has no moving parts and is sensitive to and actuated by the touch of an operator.

In the past, various approaches have been suggested to provide switches which may be actuated by the capacitance of a human touching or approaching a portion of the electronic switch or to provide switches actuated by the skin resistance of an operator lowering the D.C. resistance across the face of the switch. Several embodiments of switches utilizing one approach set out above or the other, but not both, have been invented by Willis A. Larson, either solely or jointly with others.

The switch apparatus of the present invention incorporates both the resistance concept and the capacitance concept to thus provide an electronic switch which is sensitive to or may be actuated by the touch of a human operator to thus combine the resistive and capacitive actuation of prior switches and provide an electronic switch which requires very low levels of input current to thus enhance the safe use of the switch of the present invention by humans, which may be easily fabricated, which may be easily fabricated at low cost, which may be fabricated in small size, and which can provide reliable actuation and a high level of performance at least because it is responsive to both resistance and capacitive actuation.

Further, the switch of the present invention is particularly suited to circuitry of the type where passive components are deposited upon a substrate, whether by thick or thin film techniques, and active components are in the form of integrated chips bonded to the depositions, often termed hybrid circuits, and circuitry of the type where all components are integrated, and circuitry of like type, for the purposes of this invention defined as microelectronic circuitry.

SUMMARY

In summary, a preferred embodiment of the present invention includes three electrodes immovably arranged upon an insulator in a spaced and electrically insulated manner. The first and second electrodes provide for actuation of the switch while the third electrode is arranged electrically between the first and second electrodes as an electrical shield.

In the preferred embodiment, the first electrode is coupled to an input to electronic circuitry including a first amplifier, an integrator shown as a capacitor, and a second amplifier. The input signal provided to electronic circuitry is then first amplified, next integrated, and then provided to the second amplifier where the signal provided controls the output of the second amplifier between a first state for approximating an electrical short circuit and a second state for approximating an electrical open circuit.

The second electrode, in the preferred embodiment shown, is connected to a source of D.C. potential, and the third electrode is connected to the ground or reference point in the electronic circuitry.

Thus, a switch actuating input may originate from an alternating frequency power input provided by the finger of the operator touching the first electrode or by the electrical skin resistance of the operator causing a direct current path to be set up between the first electrode and the second electrode. That is, a switch actuation may occur either by the application of sufficient alternating frequency power to the first electrode, as by the touching of the first electrode alone, or by the touching of both the first and second electrodes and thus bridging them, or both. Allowing either or both effects to cause an actuation of the electronic switch of the present invention allows the advantages set out heretofore and further reduces the effect of placement or dimensioning of the operator's finger.

It is thus a primary object of the present invention to provide a novel electronic switch which is sensitive to and actuated by touch.

It is a further object of the present invention to provide such a switch having extremely low leakage currents between electrodes to thus maintain the integrity of the switch in the OFF condition.

It is a further object of the present invention to provide such a switch where an electrode acts as a shield to prevent flow of leakage current between other electrodes.

It is a further object of the present invention to provide such a switch wherein the effect of placement of the operator's finger upon the switch face is reduced or eliminated.

It is a further object of the present invention to provide such a switch wherein the effect of variance in the dimensioning of an operator's finger is reduced or eliminated.

It is a further object of the present invention to provide such an electronic switch which is inexpensive to fabricate and of small size.

It is a further object of the present invention to provide such a switch which is reliable.

It is a further object of the present invention to provide such a switch with high noise suppression or immunity.

It is a further object of the present invention to provide such a switch which can be easily fabricated.

It is a further object of the present invention to provide such a switch which operates upon input currents of a level below that dangerous to humans.

These and further objects and advantages of the present invention will become clearer in the light of the following detailed description of an illustrative embodiment of this invention described in connection with the drawings.

Figures 1, 2:
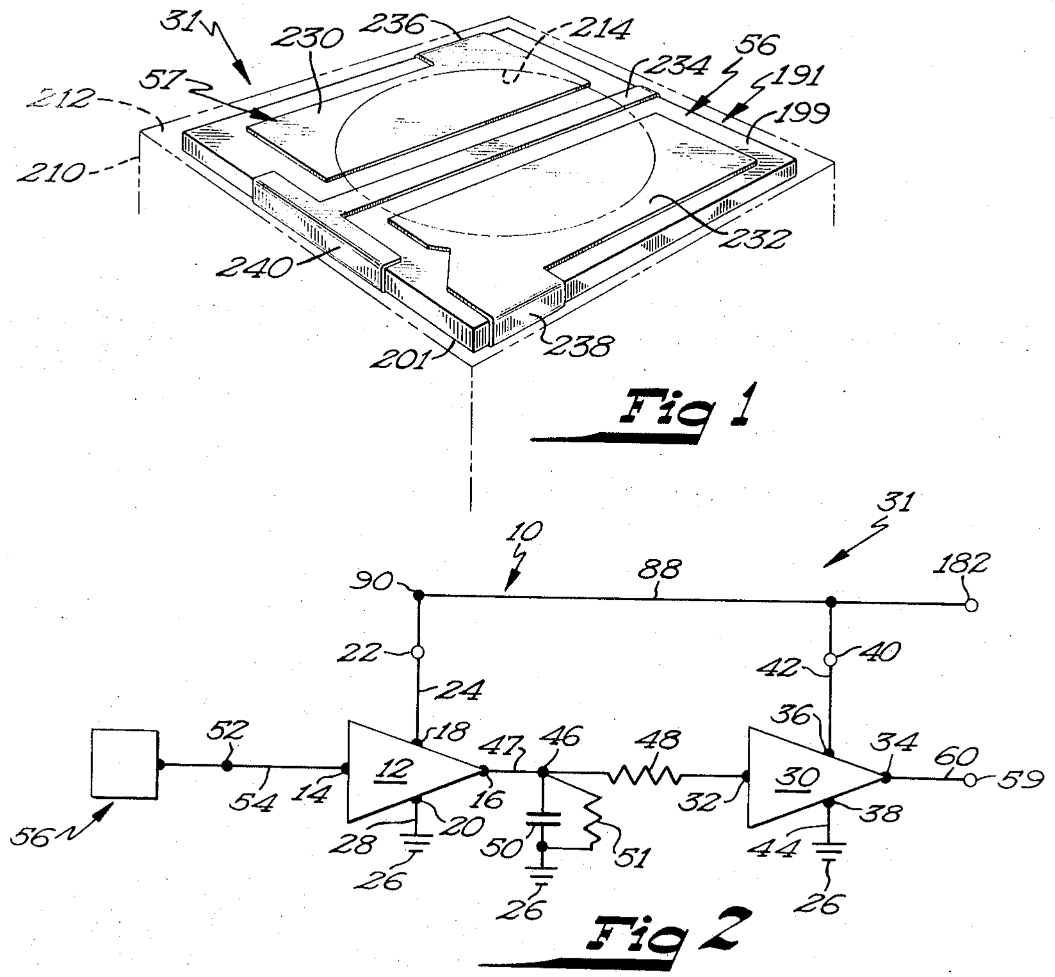
FIG. 1 shows a perspective view of an electronic switch according to the present invention specifically showing a touch portion and the interconnection of the touch portion to the microelectronic circuitry, with the encasement of the electronic switch shown in dotted line.
FIGS. 2 and 3 show schematic-diagrammatic representations of an electronic switch according to the present invention.

Where used in the various figures of the drawings, the same numerals designate the same or similar parts. Furthermore when the terms "right", "left", "front", "back", "vertical", "horizontal", "left edge", "right edge", "top", "bottom", and similar terms are used herein it should be understood that these terms have reference only to the structure shown in the drawings as it would appear to a person viewing the drawings and are utilized only to facilitate describing the invention.

DESCRIPTION

In FIG. 1, an electronic switch is shown and generally designated 31. Switch 31 includes a touch portion generally designated 56 having a touch surface 57 formed on a ceramic substrate or insulator 191 of a preferred thickness of 25 thousandths of an inch between opposed major surfaces and of a preferred dimension of 0.440 inches on each edge. Ceramic 191 includes a top surface 199 upon which touch surface 57 is formed and a bottom surface 201 upon which the microelectronics of the electronic switch of the present invention is fabricated, as will be explained further hereinafter.

FIG. 1 further shows the shell or plastic encasement 210, in dotted line, in which substrate 191 is mounted. Shell 210 includes a generally square top surface 212 having a generally centrally located circular aperture 214 defined therein to expose a portion of touch surface 57 to thus make this portion of touch surface 57 accessible to the touch of the human. The remaining portion of touch surface 57 are masked and inaccessible to the touch of the human by the remaining top surface 212 of shell 210 around aperture 214.

Touch portion 56 is shown to include two rectangles of conductive or semiconductive material 230 and 232 which function as switch electrodes. Rectangles 230 and 232 are applied to top surface 199 of substrate 191 by a conventional means, such as screening, in a manner to remain spaced and insulated from each other. A further electrode in the form of a band of conductive material designated 234 is then similarly applied to top surface 199 of substrate 191 between rectangles 230 and 232 in a manner also spaced, insulated, and separate from both rectangles 230 and 232.

Electrode 230 on top surface 199 is then connected to the electronic circuitry on bottom surface 201 of ceramic 191 in a manner described in more detail hereinafter by a connection 236 in the form of a tab portion on rectangle 230 and a wraparound or edgearound connection which may be applied to ceramic 191 by painting, edge dipping, or the like. Similarly, electrode 232 includes connection 238 and electrode 234 includes connection 240.

In FIG. 2, the electronic switching circuitry of the switch 31 of the present invention is generally designated 10. This electronic circuitry includes a D.C. to power frequency amplifier 12, including a signal input 14, a signal output 16, a power input 18, and a reference or circuit ground input 20. It is of course well known that used power frequencies are substantially 40 to 400 Hertz. Power input 18 is connected to a power terminal 22 by a wire 24 and circuit ground input 20 is connected to a circuit ground or reference generally designated 26 by a wire 28.

The electronic circuitry further includes a second D.C. to power frequency amplifier 30 including a signal input 32, a signal output 34, a power input 36, and a reference or circuit ground input 38. Power input 36 is connected to a power terminal 40 by a wire 42 and circuit ground input 38 is connected to circuit ground 26 by a wire 44.

Output 16 of amplifier 12 is connected to a junction point 46 by a wire 47. Junction point 46 is further connected to input 32 of second amplifier 30 through a high value of impedance or resistance such as resistor 48. Junction point 46 is further connected to circuit ground 26 through the parallel connection of a storage, integrating, or smoothing element, shown as capacitor 50, and a resistor 51.

Input 14 to amplifier 12 of the switching circuit 10 is shown as coupled to touch portion 56 through input terminal 52 and a connection generally designated 54.

Signal output 34 of amplifier 30 is connected to output terminal 59 of circuitry 10 by a wire 60. The electrical impedance or resistance between output terminal 59 and circuit ground 26 is then arranged in a manner hereinafter explained to approximate an electrical short circuit in a first state and an electrical open circuit in a second state, the state depending upon whether the operator's finger is touching or not touching touch portion 56.

Figure 3:
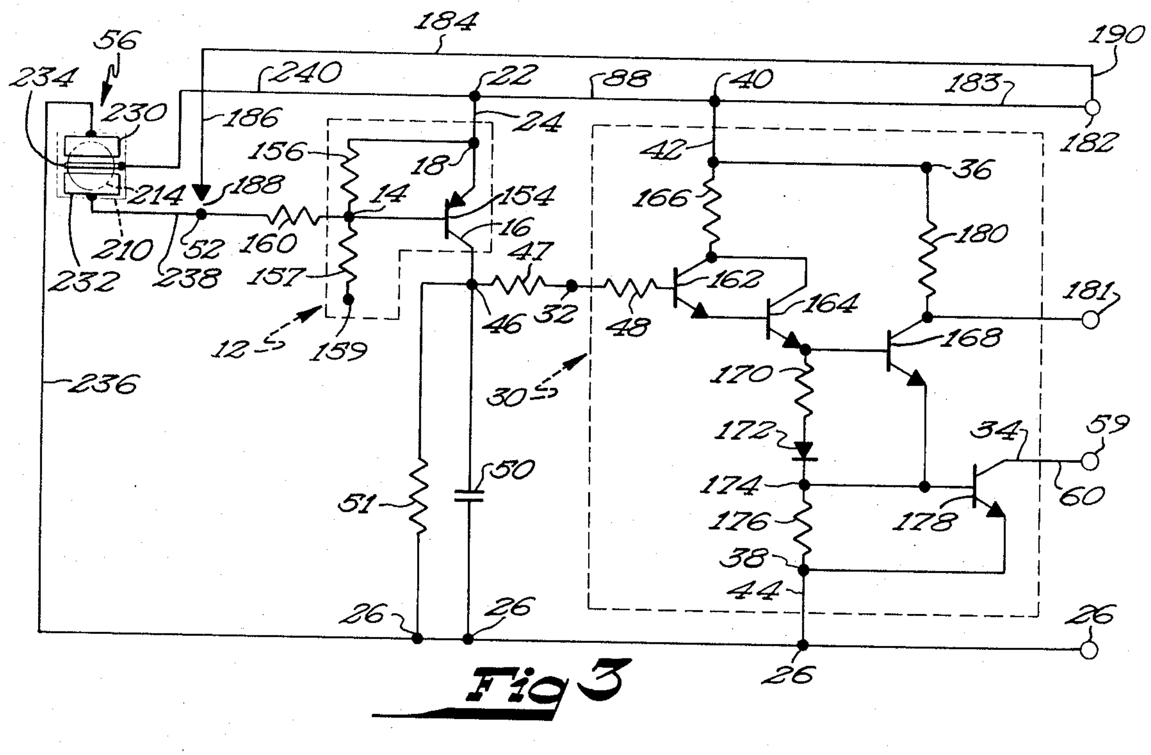

In FIG. 3, a more detailed schematic representation of the electronic circuitry of FIG. 2 is shown. Circuitry 10 of FIG. 3 includes a more detailed schematic-diagrammatic representation of touch portion 56 connected to electronics 10 by means of wires 236, 238, and 240. In particular, electrode 230 which may also be termed a second or supply electrode, is connected to reference 26 by wire 236; electrode 232, which may also be termed a first or input electrode, is connected to input 52 by wire 238; and electrode 234, which may also be termed a third or reference electrode is connected to power or supply input 22 by a wire 240.

A high value resistor 160 is then connected between input 52 and amplifier input 14. Resistor 160 is useful in protecting humans touching touch portion 56 from any alternating voltage within circuitry 10 and further in protecting the circuitry 10 from damage due to excessive currents induced through touch portion 56, such as by a direct connection to a high voltage source or by static electricity from the human operator.

Amplifier 12 includes a PNP transistor 154 which having its emitter connected to junction point 22 through junction point 18 and connection 24, its collector connected by a wire 16 to a junction point 46, and its base connected to input 14. A resistor 156 is then connected between junction point 18 and input 14. A further resistor 157 is connected between junction point 14 and a further junction point 159 to provide for "latching" of the switch as will be more fully explained hereinafter.

Junction point 46 is further connected to the base of an NPN transistor 162 through a series connection of high value impedances or resistance 47, junction point 32 and resistance 48.

Transistor 162 is shown in a Darlington arrangement with NPN transistor 164 and thus having their common collectors connected to a junction point 40 through a resistor 166, junction point 36, and connection or wire 42. Junction point 40 is connected to junction point 22 by a conductor 88 and to a junction point 182 by a wire 183.

The emitter of transistor 162 is connected to the base of transistor 164, while the emitter of transistor 164 is connected to the base of a further NPN transistor 168 and to a junction point 38 through a series connection of resistor 170, diode 172, junction point 174, and resistor 176.

The collector of transistor 168 is directly connected to a junction point 181 and is connected to a junction point 36 through a resistor 180.

Junction point 174 is also connected to the emitter of transistor 168 and to the base of an NPN transistor 178 which has its collector connected to an output terminal 59 and its emitter connected to junction point 38. Junction point 38 is then connected to an extension of junction point 26 by wire 44.

The amplifier designated 30 is then defined from the aforementioned parts, in particular transistors 162, 164, 168, and 178, resistors 48, 166, 170, 176, and 180, diode 172 and the interconnection of these parts.

A further connection may be made between output terminal 59 and junction point 159. Such a connection is not shown in the figures. This connection causes the switch circuitry of electronics 10 to "latch" or maintain output condition caused by the operator's touch of portion 56 in spite of the discontinuance of the operator's touch.

Electronic circuitry 10 of FIG. 3, which in the preferred embodiment is microelectronic circuitry, is shown as protected from damage which may be caused by the application of static electricity carried by the body of the operator in a manner described and claimed in application Ser. No. 280,258, filed Aug. 14, 1972 in the name of Willis A. Larson and David E. Colglazier.

In particular, a protective conductor 184 is seen as having a first end 186 arranged at a distance from the input 52 to the microelectronic circuitry 10 to define a protective spark gap 188. Protective conductor 184 includes a second end 190 connected to junction point 182.

Also, compatibly and cooperatively arranged with spark gap 188, in the preferred embodiment, is the resistive nature of the electrodes 230 and 232 formed upon top surface 199 of substrate 191 as shown in FIG. 1. This effect is also disclosed and claimed in the above referred to application Ser. No. 280,258.

It will now be appreciated by those skilled in the art that power to circuitry 10 can be applied through junction points 182 and 26. If junction point 26 is to be considered the reference or ground for circuitry 10, a voltage positive with respect to the voltage applied to junction point 26 must be applied to junction point 182. Conversely, if junction point 182 is to be considered the circuit reference or ground, a voltage negative with respect to the voltage upon junction point 182 must be applied to junction point 26. All of this is familiar to those skilled in the art.

Since, for the purposes of providing a reference for the high currents which may be caused by the application of static electricity to electronic circuitry 10, either a source of voltage or a reference point within a source of voltage can function as a sufficient conductor of current to earth ground, it is of no consequence as to whether reference junction point 182 is actually a source of voltage or a reference within a source of voltage.

As set out above, electrodes 230 and 232 may be applied to top surface 199 of substrate 191 by conventional means, such as screening. These electrodes may be of a pure conductive nature or may be of a semiconductive material such as that disclosed in the above application Ser. No. 280,258.

Electrode 234, in the preferred embodiment, is a pure conductor, and thus two fabrication steps may be required if electrodes 230 and 232 are of a semiconductive material and electrode 234 of a conductive material.

The preferred manner of fabricating the microelectronic circuitry 10 of the figures is set out in detail in the above referenced application Ser. No. 280,258.

OPERATION

Briefly, the electronic switch 31 of the present invention operates in response to the touch of an operator's finger upon touch surface 57 of touch portion 56 thus causing a change of state of the impedance between output terminal 59 and junction point 26 of electronic circuitry 10.

Electronic circuitry 10 shown in the figures operates as explained in detail in application Ser. No. 235,671 filed Mar. 17, 1972, in the name of the present inventor. Very basically, the touch of the operator's finger provides an input to transistor 154 which is amplified to charge capacitor 50. Capacitor 50, once charged, and resistors 47 and 48 approximate a current source for the high gain amplifier 30. The current from capacitor 50 is then amplified by amplifier 30 such that the electrical impedance or resistance between output terminal 59 and junction point 26 approximates an electrical short circuit in a first state and an electrical open circuit in a second state, the state depending upon whether the operator's finger is touching or not touching touch portion 56.

It is to be noticed that an input to transistor 154 may be provided in at least two ways. Firstly, the input to transistor 154 may be provided upon the bridging of electrodes 230 and 232 by the finger of an operator in a manner to lower the D.C. resistance between these electrodes thus providing a D.C. bias current to transistor 154. This manner of actuation is explained in detail in application Ser. No. 199,384 filed Nov. 16, 1971 in the name of Willis A. Larson and Arthur Kimmell, now abandoned in favor of a continuation application, and in application Ser. No. 199,195 filed Nov. 16, 1971 in the name of Willis A. Larson, also now abandoned in favor of a continuation application.

An input to transistor 154 may also be provided through the capacitance of an operator's finger as between electrode 232 and earth ground. The capacitance of the operator's finger provides a reference between input 14 and earth ground which appears to amplifier 12 as an alternating frequency power input as explained in detail in the above referenced application Ser. No. 235,671. Further, electronics of the type disclosed in application Ser. No. 284,043 filed Aug. 28, 1972 in the name of Willis A. Larson and David E. Colglazier may be used.

Thus, an electronic switch according to the present invention may be made without moving parts, aside from the movement of the operator's finger, and may be actuated by the referencing of an amplifier or by the bridging of switch electrodes thus lowering the D.C. resistance across the face of the switch. Each of the switch electrodes is laterally immovably attached to ceramic 191 with laterally immovably attached, for the purposes of this invention, defined to be fixed with respect to each other in a manner to prevent the electrodes from coming into direct electrical contact. It is to be noticed that either electrode may be made vertically movable, as by using a soft or spongy material or springs to give the effect or feeling of vertical movement to an operator's finger. Other means for effecting this illusion of vertical movement upon actuation will be envisioned by those skilled in the art.

Thus, since the invention disclosed herein may be embodied in other specific forms without departing from the spirit or general characteristics thereof, some of which forms have been indicated, the embodiments described herein are to be considered in all respects illustrative and not restrictive. The scope of the invention is indicated by the appended claims, rather than by the foregoing description, and all changes which come within the meaning and range of equivalency of the claims are intended to be embraced therein.

What is claimed is:

1. Electronic switch apparatus operable by the touch of an operator's finger, comprising in combination: at least three switch electrodes arranged and insulated from each other with the first switch electrode and the second switch electrode laterally immovably fixed with respect to each other in a manner to prevent first switch electrode from coming into direct electrical contact with the second switch electrode and with the top surfaces of the first switch electrode and second switch electrode exposed to the finger of an operator for allowing an operator's finger to touch both the first electrode and the second electrode and with the third switch electrode arranged electrically between the first switch electrode and the second switch electrode, laterally immovable, and insulated from each of the first electrode and second electrode as a conductive electrical shielding electrode preventing by its presence a flow of electrical current between the first electrode and the second electrode; means for providing a connection to a reference; a first amplifier including input means and output means; a second amplifier including input means and output means; storage means; means for providing a connection to a source of D.C. potential for at least one of the first amplifier and second amplifier; means for providing a connection between at least one of the first amplifier and second amplifier and the reference means; means for connecting the storage means between the output means of the first amplifier means and the reference means; means for providing a connection between the output means of the first amplifier and the input means of the second amplifier; means for providing a connection between the first electrode and the input means of the first amplifier; means for providing a connection between the second electrode and the means for providing a connection to the source of D.C. potential; and means for providing a connection between the third electrode and the reference means.

2. The electronic switch apparatus of claim 1, including an insulator having opposed major surfaces and at least three edges, with a first major surface of the insulator supporting the electrodes and the second major surface supporting the first amplifier, second amplifier, and storage means.

3. The electronic switch apparatus of claim 2, wherein each of the electrodes is arranged adjacent an edge of the insulator and wherein connection is made to the respective electrodes through connections around the edge of the insulator.

4. The electronic switch apparatus of claim 3, wherein the first electrode constitutes a rectangle of material, the second electrode comprises a rectangle of material; and wherein the third electrode comprises a band of conductive material arranged between the rectangles of the first electrode and second electrode.

5. The electronic switch apparatus of claim 2, wherein the first electrode constitutes a rectangle of material, the second electrode comprises a rectangle of material; and wherein the third electrode comprises a band of conductive material arranged between the rectangles of the first electrode and second electrode.

6. The electronic switch apparatus of claim 1, wherein the first electrode constitutes a rectangle of material, the second electrode comprises a rectangle of material; and wherein the third electrode comprises a band of conductive material arranged between the rectangles of the first electrode and second electrode.

* * * * *